United States Patent [19]

Worth

[11] 4,334,378

[45] Jun. 15, 1982

[54] LIGHT WEIGHT CASTING ROD HANDLE

[76] Inventor: Charles C. Worth, 136 Cypress Ave., Kentfield, Calif. 94904

[21] Appl. No.: 158,232

[22] Filed: Jun. 10, 1980

[51] Int. Cl.³ ........................................... A01K 87/06
[52] U.S. Cl. ............................................... 43/22
[58] Field of Search .................. 43/22, 21.2, 23; 145/61 C, 61 H, 61 M

[56] References Cited

U.S. PATENT DOCUMENTS

| | | | |
|---|---|---|---|
| D. 165,529 | 12/1951 | Kitterman | 43/23 |
| 2,485,144 | 10/1949 | Espenship | 43/22 |
| 3,229,405 | 1/1966 | Veeder | 43/22 |
| 3,606,326 | 9/1971 | Sparks et al. | 145/61 M |
| 3,770,033 | 11/1973 | Gavillet et al. | 145/61 H |
| 3,955,451 | 5/1976 | Lohness | 145/61 C |
| 4,023,606 | 5/1977 | Kneissl | 145/61 H |

Primary Examiner—James L. Jones, Jr.
Attorney, Agent, or Firm—Melvin R. Stidham

[57] ABSTRACT

A light weight casting rod handle, including a generally cylindrical core of a rigid plastic with a recess intermediate its ends to receive a foot of a reel. At the forward end of the recess, a generally annular hood, integral with the core, overlies and surrounds the hole through which the conventional foot clamping device extends, to strengthen an otherwise weak section. Further to strengthen the core, a length of metal channel is embedded in it to underlie the recess. A coating of a resilient foam plastic covers the core, with a plurality of lateral extensions on the core embedded therein to interlock it.

5 Claims, 8 Drawing Figures

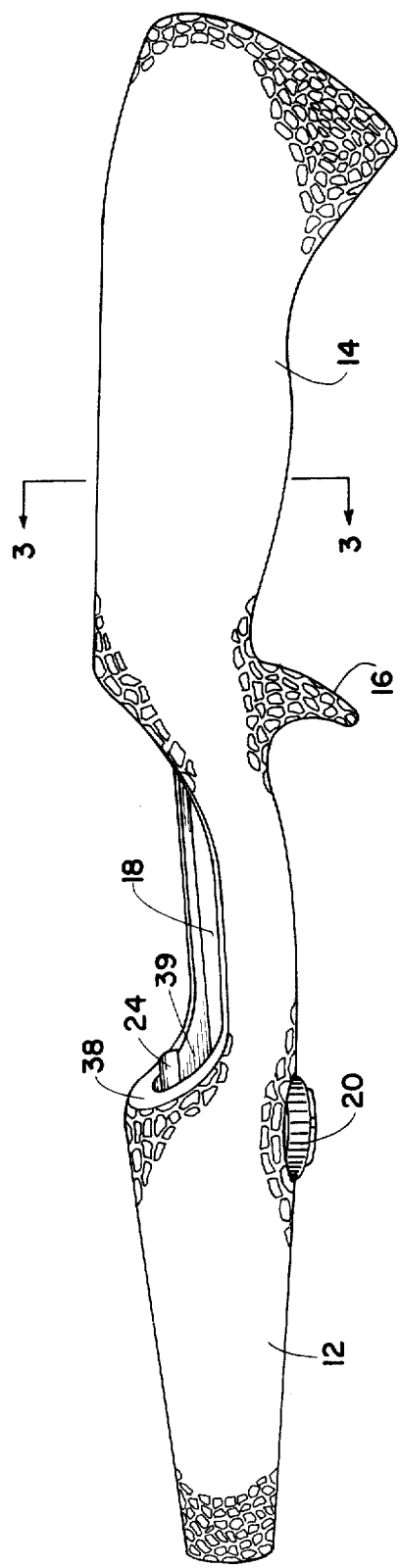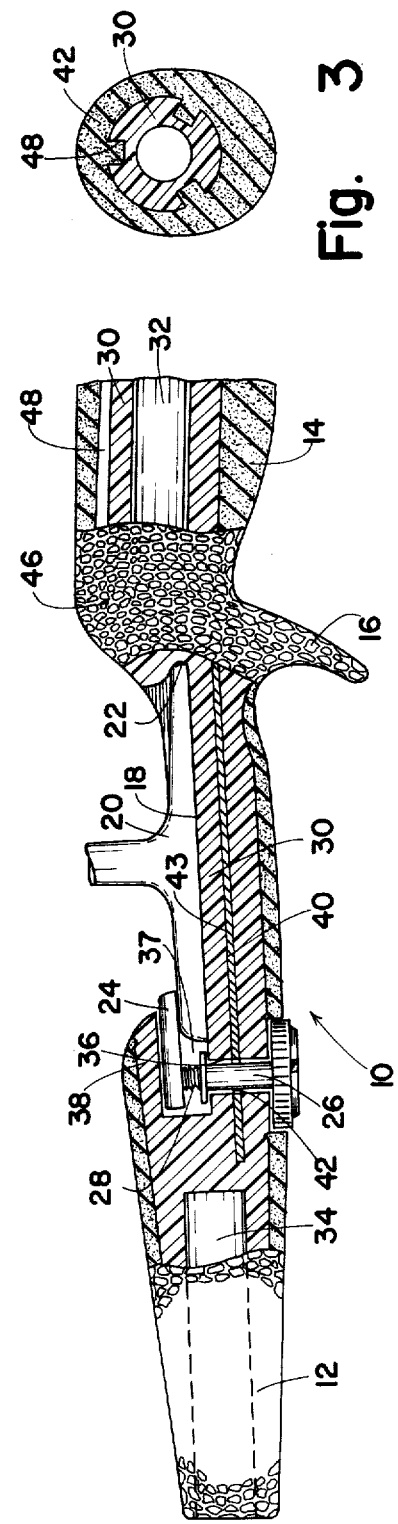

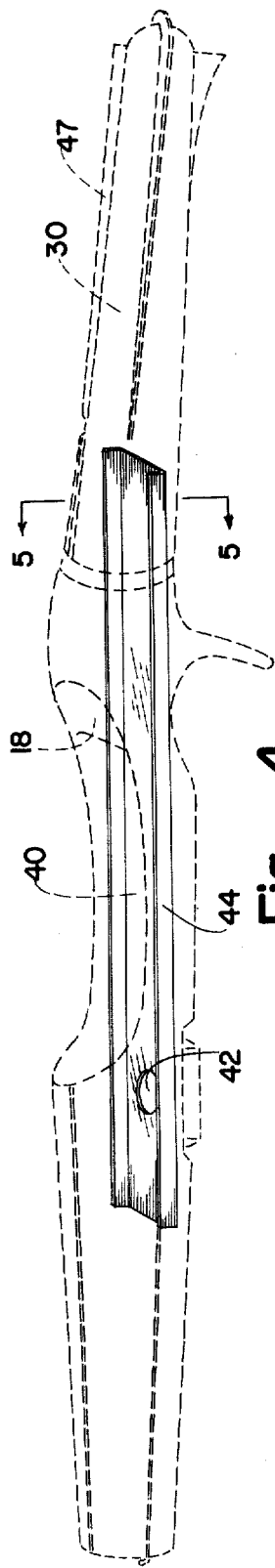
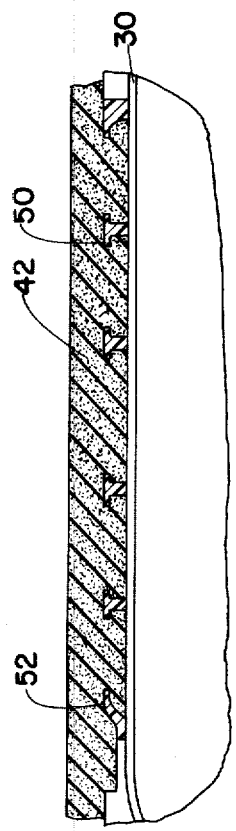
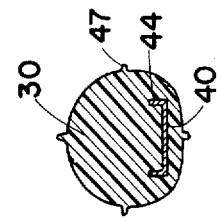
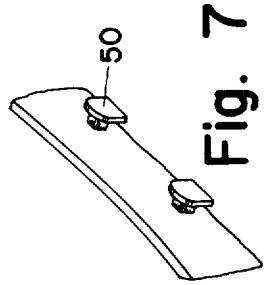
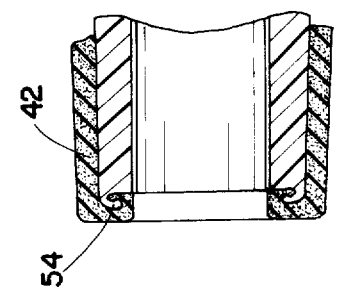

LIGHT WEIGHT CASTING ROD HANDLE

BACKGROUND OF THE INVENTION

Efforts are being made to make fishing rod handles, and particularly casting rods, as light as possible to facilitate manipulation thereof. Such handles conventionally have a recess towards the forward end thereof to receive the foot of a reel which is generally clamped in place by a threaded clamp member extending through a hole from the bottom of a handle. Particularly when the rod is made of plastic materials to minimize weight, the reel foot depression, and particularly the area of the clamping hole, produces a relatively weak section which limits its test strength. Another disadvantage in certain plastic handles resides in the difficulty in maintaining a firm grip unless roughened. Moreover, they can become uncomfortable to handle, particularly in cold weather.

OBJECTS OF THE INVENTION

It is an object of this invention to provide a lightweight casting handle with the usual recess for the reel foot but which has considerable test strength.

It is a further object of this invention to provide a light-weight casting handle which is easy and comfortable to grip.

Other objects and advantages of this invention will become apparent from the description to follow, particularly when read in conjunction with the accompanying drawings.

SUMMARY OF THE INVENTION

In carrying out this invention, I provide a central handle core of a suitable lightweight rigid plastic and having a recess for the foot of a reel. Embedded in the core and underlying the recess is a length of metal channel with the hole for the threaded clamping means extending through it. A annular hood, integral with the core extends rearward from the forward end of the recess to overly and surround the hole and strengthen the rod in this area.

The entire core is covered with an outer coating of a resilient sponge plastic, and embedded in the sponge are a plurality of lateral projections on the core to interlock with the foam. The resiliency, enables a firm grip without excessive pressure, and makes the handle comfortable to handle, even in cold weather.

BRIEF DESCRIPTION OF THE DRAWINGS

In the drawings:

FIG. 1 is a view in perspection of a casting rod handle embodying features of this invention;

FIG. 2 is a partial side view of the handle partially broken away;

FIG. 3 is a section view of the handle taken along line 3—3 of FIG. 2;

FIG. 4 is a phantom view of the handle in perspective;

FIG. 5 is a section view taken along line 5—5 of FIG. 4;

FIGS. 6 and 8 are partial section views; and

FIG. 7 is a view in perspective of interlocking members to anchor the outer coating of the handle.

DESCRIPTION OF A PREFERRED EMBODIMENT

Referring now to FIGS. 1 and 2 with greater particularity, there is shown a casting rod handle 10 including a nose or foregrip portion 12 and a tang or grip 14, which simply for illustration, is shown as a pistol grip with a trigger 16. Intermediate the ends of the handle 10 is a recess or reel seat 18 which is adapted to accommodate the foot of a conventional fishing reel, which is shown partially at 20 in FIG. 2.

The foot 20 of the reel is received in an indentation 22 at the back of the seat 18, and the forward end of the foot 20 is secured in place by means of a tab 24, which is tightened down by means of a hand operated nut 26 on a screw 28.

The core 30 of the handle 12 is preferably made of a suitable, fairly rigid plastic, such as acrylic butadienne styrene, in order to minimize weight, and the weight may be further decreased by making a portion of the handle hollow, as at 32. A fairly deep cylindrical receptacle 34 at the foregrip 12 is adapted to receive the rod itself (not shown).

With the material omitted to form the recess or foot seat 18, a plastic handle, such as has thus far been described, tends to be weakened at the mid area, and particularly in the area of the transverse passageway 36 for the threaded nut 26. In the handle 10 of this invention, this area is strengthened considerably by extending the sides 37 of the recess around in full annular configuration to form a tubular hood 38 which extends over much of the tab 24, and at least around and over the screw passageway 36. The result is a reinforced and much stronger handle 10.

As the further feature of this invention, the handle core 30 may be molded around a metal channel 40 (FIGS. 2 and 4), which extends beyond both ends of the reel foot recess 18, with a hole 42 being formed therein, near the forward end thereof, to accommodate the tab screw 26. The channel is preferably disposed, as shown, with its web 43 disposed parallel to the base of the recess and with its legs 44 upstanding, for maximum resistance to bending.

As a further feature of this invention, a coating 46 of relatively soft foam material, such as polyvinyl chloride, neoprene rubber or the like is molded on to the harder core 30 and interlocks therewith. For the purpose of interlocking against relative rotation of the core 30 and cover 46 the core 30 is provided with a plurality of surface irregularities, such as ridges 47 (FIGS. 4 and 5) or splines 48 (FIGS. 1 to 3). To supplement this, a plurality of Tees or mushroom like members 50 as well as tabs 52 and 54 (FIG. 8) are provided for a positive interlock between the hard plastic core 30 and the softer foam covering 46.

The softer foam provides a more comfortable grip; it generally has a higher coefficient of friction than the smooth, hard core; and it provides an excellent heat insulator against the cold core when exposed to adverse weather conditions.

While this invention has been described in conjunction with a preferred embodiment thereof, it obvious that modifications and changes therein may be made by those skilled in the art to which it pertains, without departing from the spirit and scope of this invention, as defined by the claims appended hereto.

What is claimed as invention is:

1. A lightweight casting rod handle comprising:

an elongated, generally cylindrical core of a rigid plastic;

a recess intermediate the ends of said core adapted to receive the foot of a reel;

a hole from the bottom of said core open into said recess at the forward portion thereof;

a hand-operated threaded member extending through said hole; and a reel-foot clamp threadedly engaged with said member;

the improvement comprising:

a tubular extension of said core extending rearward from the forward end of said recess to overlie said hole and provide an integral annular hood surrounding same.

2. The handle defined by claim 1 including:

an outer coating of a resilient foam plastic on said core; and a plurality of lateral projections on said core and embedded in said outer coating to interlock with same.

3. The handle defined by claim 2 wherein:

said lateral projections are generally of mushroom shape for interlocking with said outer coating.

4. The handle defined by claim 2 wherein:

said core is of spline configuration to interlock with said coating against relative rotation.

5. The handle defined by claim 1 including:

a length of metal channel embedded in said core with the web thereof underlying said recess; and an aperture in said web aligned with the hole through said core.

* * * * *